H. G. DAVIS.
SEAM WELDING APPARATUS.
APPLICATION FILED APR. 30, 1913.
1,233,451.
Patented July 17, 1917.
2 SHEETS—SHEET 1.
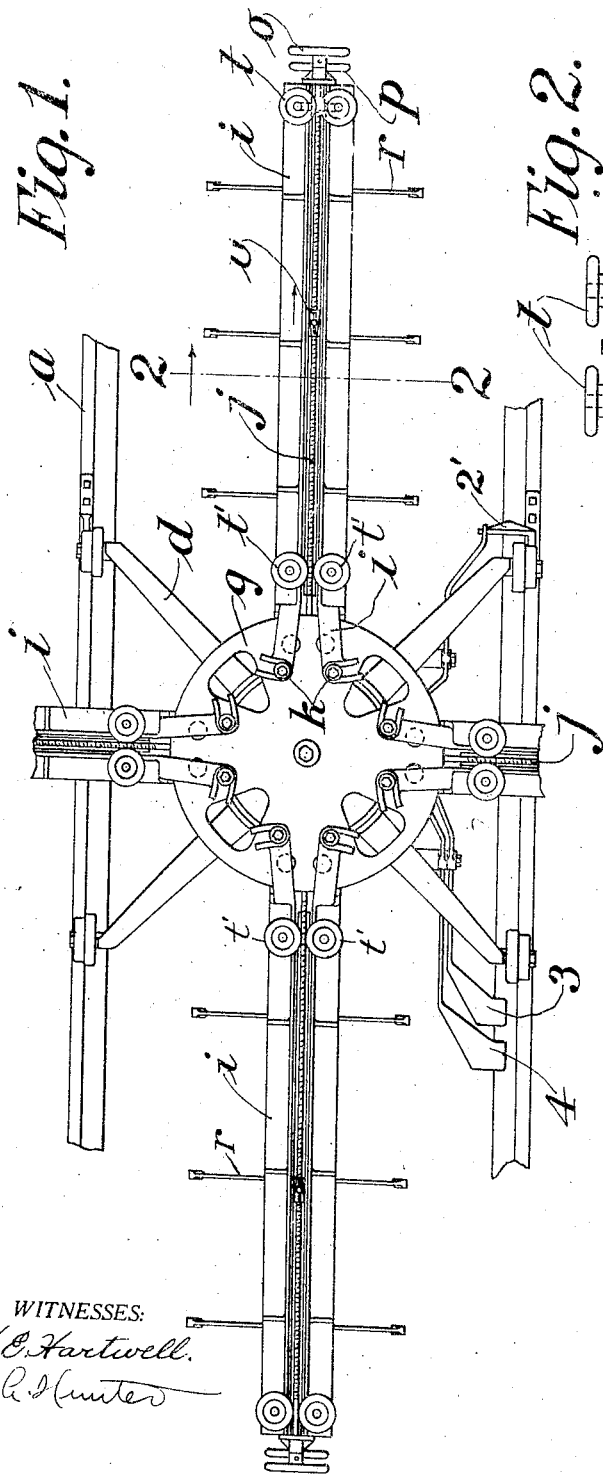
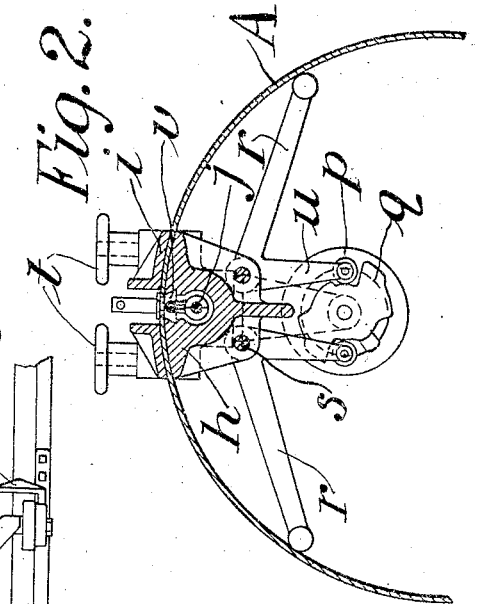
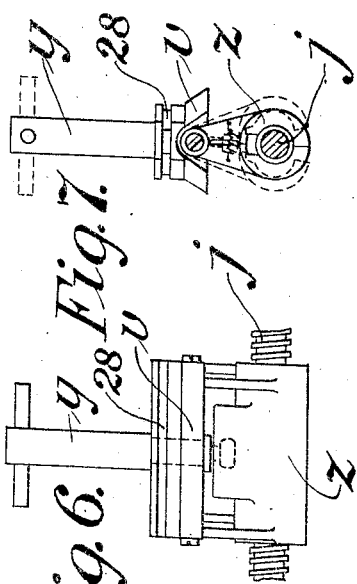
WITNESSES:
H. E. Hartwell.
INVENTOR.
Henderson G. Davis.
BY
Chapin & Co.
ATTORNEY H. G. DAVIS.
SEAM WELDING APPARATUS.
APPLICATION FILED APR. 30, 1913.
1,233,451.
Patented July 17, 1917
2 SHEETS—SHEET 2.
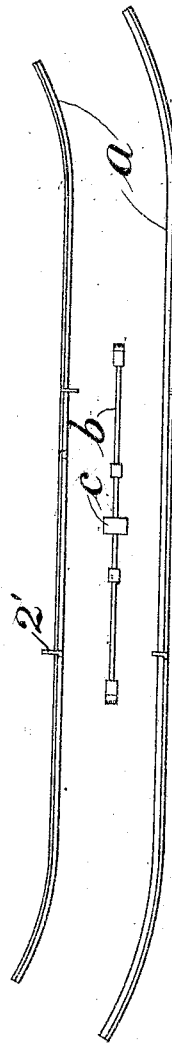
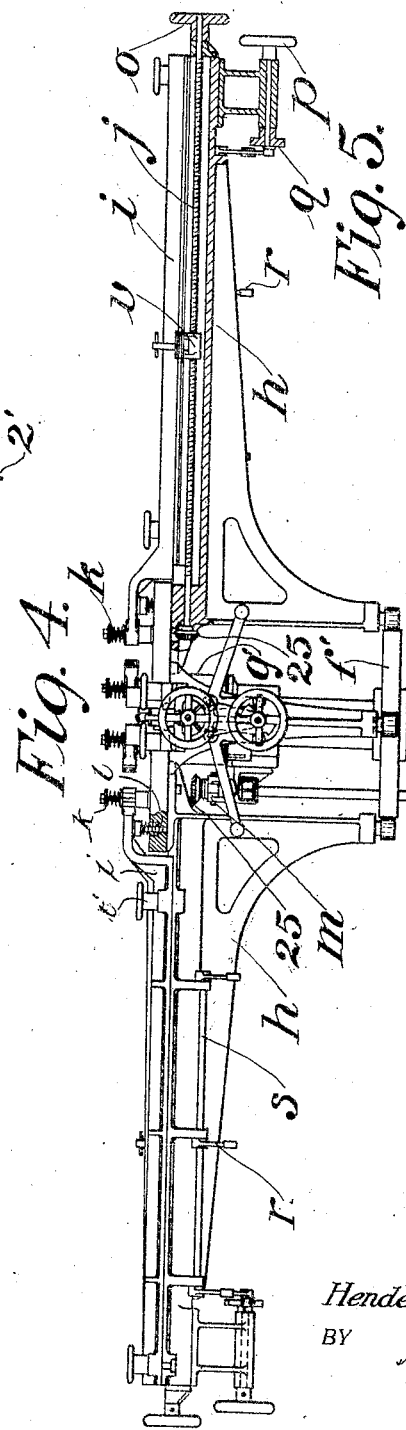
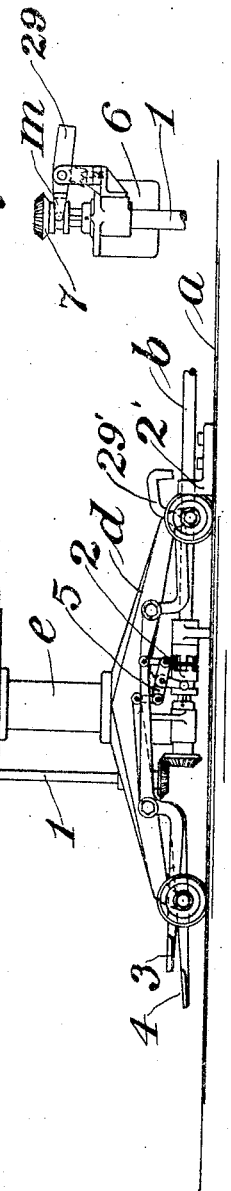
WITNESSES:
H. C. Hartwell.
M. A. Hunter
INVENTOR.
Henderson G. Davis.
BY Chapin & Co.
ATTORNEY

UNITED STATES PATENT OFFICE.

HENDERSON G. DAVIS, OF CONSHOHOCKEN, PENNSYLVANIA, ASSIGNOR TO GILBERT & BARKER MANUFACTURING COMPANY, OF WEST SPRINGFIELD, MASSACHUSETTS, A CORPORATION OF MASSACHUSETTS.

SEAM-WELDING APPARATUS.

1,233,451. Specification of Letters Patent. Patented July 17, 1917.

Application filed April 30, 1913. Serial No. 764,530.

*To all whom it may concern:*

Be it known that I, HENDERSON G. DAVIS, a citizen of the United States of America, residing at Conshohocken, in the county of Montgomery and State of Pennsylvania, have invented new and useful Improvements in Seam-Welding Apparatus, of which the following is a specification.

This invention relates to a seam-welding apparatus, and is particularly designed for autogenous welding. Autogenous welding is coming into quite extensive use in the manufacturing arts, especially in connection with the oxy-acetylene flame. It has been heretofore customary to perform autogenous welding operations with other gases than oxy-acetylene, but the oxy-acetylene flame has been found to be so much more efficient than any other practical combination of gases that it has given a considerable impulse to the use of the autogenous welding process. The invention herewith is designed particularly for use with the oxy-acetylene flame, but it can be used with other forms of heat-producing means.

In welding a seam with the oxy-acetylene flame the two edges which are to be seamed together cannot be held during the welding process and give good results with the edges abutting, for the heat necessary to the process causes a considerable expansion of the metal which is welded, which, if the edges are kept close together would cause overlapping, and these overlapping edges would prevent a proper seaming operation. Where the edges overlap it is impossible for the heat to be evenly transmitted to the metal to be welded. This causes a weak seam, which is one of the most difficult things to avoid in autogenous welding.

In the present practice, great difficulty is found in keeping the edges of the part to be seamed a proper distance apart, and it takes an operator of considerable skill to properly do the work. There is also a great amount of labor required in handling the parts to be welded, and this labor is usually and necessarily, under the present practice, done by the skilled laborer. This labor is due to the necessary handling of the parts to be welded, particularly in welding metal tanks, which are large and cumbersome and of considerable weight. The skilled operator needs to adjust the tank to be welded himself in order to have it properly adjusted and then must handle the flame giving the required welding heat, together with the tank, and if the parts have not been properly adjusted and the flame is not properly handled a very poor operation will result, frequently injuring the tank to be welded.

This invention has for one of its objects, among other things, to provide convenient holding means or devices for properly supporting and holding the parts to be joined in welding position. Another object of the invention is to provide such holding means together with mechanism for properly distancing the edges to be joined with relation to one another so that the application of the welding heat will cause the edges as they are welded to expand and come together in properly abutting relation, whereby a flat and not an overlapping seam will be formed. A further object of the invention is to provide a holding means for the parts to be welded together with distancing devices or mechanism for the edges to be joined, all arranged in duplicate so that the skilled operator may be occupied in those operations that require skill and not occupied in merely handling and adjusting the apparatus, for the latter, by the use of this invention, may be done with ordinary labor. A further object of the invention is to provide a supporting and holding means for parts to be joined in autogenous welding operable to frictionally hold the edges to be joined in approximate position for welding, together with a device for positively holding the edges apart arranged to travel between the edges during the welding operations. A further object of the invention is to provide an apparatus of the class described which may be adjusted for handling different sized parts and particularly for handling different sized tanks in which it is desired to weld the necessary seams by the methods described. A further object of the invention is to provide an apparatus of the class described having a structure and arrangement which will support the parts to be welded and allow the edges in the welding operation to be comparatively free of heat-conducting members so that the heat, when applied to the edges to be heated, will be evenly distributed. A further object of the invention is to provide an apparatus of the class described having an operable distancing means, together with means for moving said distancing means between the edges to be welded at approximately the same speed as the welding flame is to travel in the welding operation, thus holding the edges apart at a proper distance in advance of the flame so that the heat given out by the flame will cause the edges to expand into a properly welded seam. Another object of the invention is to provide an apparatus of the class described which will support the parts to be welded and after such parts are properly placed on the apparatus the latter will operate to adjust the parts before the welding operations in an automatic manner. A further object of the invention is to provide a generally efficient construction, operable and arranged in the manner described.

With these objects in view, the apparatus, in the embodiment chosen for the purposes of illustration, comprises a traveling supporting stand which may be connected to a suitable operating power. This stand is provided with a vertical supporting central post on which radial supporting arms are rotatably mounted. Each of these arms is provided with means for supporting a cylindrical tank in position for welding the longitudinal seam in making the tank. This supporting means comprises the main supporting arm having surfaces approximately concentric with a given range of tanks, together with supporting members adjustably mounted to properly support a heavy tank in position for its seam-forming edges to be distanced apart and movably-mounted members arranged to bear on the top surface of the tank and frictionally hold the margins of the tank against the concentric surfaces mentioned in order to hold the edges of the tank approximately in position to be welded. There is also provided on each supporting arm a feed-screw on which is mounted, for travel between the edges of the tank, a distancing-device operable to travel at the same speed as required for the travel of the flame in the seam-forming operation. This distancing device is arranged to travel in advance of the welding flame in order not to be affected by the heat of the latter and separates the edges of the tank to be welded. The separation of the edges at the distancing device is relatively large, but the edges thus separated converge toward the welding flame and are there separated a proper amount so that the edges as they expand from the heat of the flame just meet as they are welded and cause a perfectly flat seam.

Further detailed arrangements having specific advantages in an apparatus of this class will appear in the detailed description.

Referring to the figures,—

Figure 1 is a plan view of the assembled apparatus, showing the two radial arms and the supporting stand in full and having two other arms cut away to save space;

Fig. 2 is a section taken on the line 2—2 of Fig. 1 showing a shell supported in position for welding;

Fig. 3 is a plan view of the track on which the apparatus is designed to be mounted, together with a shaft adapted to be connected to a driving-pulley and having a clutch-member arranged to be connected with a corresponding clutch-member on the apparatus;

Fig. 4 is a side elevation of the apparatus showing one supporting arm in section to illustrate the mechanism connected therewith;

Fig. 5 is a detail view showing a hand clutch mechanism and the method of operating the gear on the driving-shaft to connect and disconnect the gear of the feed-screw carried by each arm;

Fig. 6 is a side detail view showing the traveling distancing-device; and

Fig. 7 is a front detail view of the part shown in Fig. 6.

Referring to Fig. 4,—the apparatus comprises a stand having four legs $d$ (seen in Fig. 1) on the end of which are wheels adapted to ride on the track $a$. In the central part of the apparatus a vertical supporting post $e$ is mounted. A table or turret member $g$ is rotatably mounted on the upper part of this supporting post and has a depending portion $g'$ (see Fig. 4) which has a suitable ball bearing connection with the part $e$. As shown, this table or turret-member $g$ has four supporting arms $h$ extending therefrom. The inner ends of these arms $h$ have a depending portion provided with a roll at the end thereof adapted to bear on the horizontal circular plate $f'$. The upper ends of these arms $h$ are fastened securely to the under side of the rotatably-mounted table $g$. When a heavy weight is supported on the arms $h$, an excessive strain is prevented on the bearings of the table $g$ by means of the circular plate $f'$ attached to the vertical post $e$ and the rolls on the ends of arms $h$ which bear against the outer periphery of this plate in order to compensate for the thrust due to the heavy weight on the arms at a distance from their supporting means.

The arms $h$ are shown in cross-section in Fig. 2, and they have on the top two radial surfaces which are approximately concentric to a given range of tanks which may be handled by the apparatus. There is an open radial recess in each arm $h$ in which is mounted the radial feed-rod $j$ which may be turned by hand through the operating-wheel $o$ at the outer end thereof or by power through a connection with the gear 7 mounted on the upper end of the main drive-shaft 1 of the apparatus. On this feed-rod $j$ a traveling distancing-device $v$ is adapted to travel. This distancing-device is seen in plan in Fig. 1, in operable position in Fig. 2, and in side and end elevations in Figs. 6 and 7. The device $v$ has at its lower end bevels which are arranged to slide and be supported in corresponding beveled slide-grooves at the upper sides of the recess provided in each of the arms $h$. Just above these bevels there are horizontal wedge-shaped slots 28 (see Figs. 6 and 7) in which the edges of the tanks to be welded are adapted to fit. On the distancing-device $v$ two threaded depending clamping-members $z$ are pivoted and connected by a spring as shown in Fig. 7. Each of these members $z$ is provided with threads to coöperate with the threads in the feed screw $j$, and a vertical adjusting-rod $y$ is mounted in the distancing-device $v$, as shown in Figs. 6 and 7. At the bottom of this rod $y$ is a small cam (shown dotted in Figs. 6 and 7). When the rod $y$ is turned one hundred and eighty degrees from the position shown in Fig. 6, as indicated in dotted lines in Fig. 7, the cam operates to force the two pivoted members $z$ against the action of their spring and thus bring the threads of these members $z$ out of engagement with the threads of the rod $j$. When this has been done, it will be seen that the distancing-device $v$ may be slid to any desired point along the arm $h$ by means of the slide therein (see Fig. 2).

Mounted above the concentric surfaces of the arm $h$ are adjustable gripping-members $i$, one for each concentric surface and with a concentric surface corresponding thereto. These gripping-members $i$ are adapted to be held in place by means of the bolts $t$ and $t'$, operable by hand, as indicated in Figs. 1 and 2. The bolts $t$ pass freely through bosses on the members $i$ and on the arm $h$, and at the lower end a headed part is formed adapted to slide in an open-ended slot as indicated in Figs. 1 and 4. Each bolt $t'$ forms a pivot for its member $i$ and by turning the heads of the bolts $t$ and $t'$, the parts $h$ and $i$ will frictionally hold tank A. The inner ends of the members $i$ are formed with forks which loosely engage rods $k$ vertically mounted in table $g$, one for each gripping-member, as indicated in Figs. 1 and 4. A strong spring mounted between the upper end of the rod $k$ and the upper part of the inner end of the device $i$ tends to force the inner end of the latter downwardly. Each device $i$ has, at a slight distance radially from the rod $k$, a spring-pressed rod $l$ mounted in table $g$ operating to press the device $i$ upwardly. This arrangement is provided in order to balance the weight of the devices $i$ so that they will move horizontally without tending to bind on their pivotal connections $t'$.

On each arm $h$ there are arranged two horizontal rods $s$, along which a series of supporting arms $r$ are fastened. These arms are adapted to spread out and support the weight of the tank, as indicated in Fig. 2. At the end of each rod there is an arm $u$ fixed thereto and having a roller at its lower end, as indicated in Fig. 2. These rollers are adapted to coöperate with the surface of the cam $q$ mounted on a rod having a bearing in a bracket arranged at the end of the arm $h$. The cam may be turned, and thus adjusted, by the hand-wheel $p$. By turning the cam $q$, it will be seen from Fig. 2 that the arms $u$ may be set to four distinct positions, and by changing the positions of the arms $u$ the rods $s$ are turned and the supporting arms $r$ are swung outwardly or inwardly, as the case may be, in order to support tanks of different sizes.

The main driving-shaft 1 of the apparatus is indicated in Fig. 4 and is arranged vertically, with the bevel-gear 7 at the top thereof arranged to mesh with any one of the bevel-gears 25, one at the inner end of each rod $j$. This driving shaft 1 has a bevel gear connection at its lower end with the small stud shaft, best seen in Fig. 4. At the opposite end of this stud shaft is a clutch member 2, keyed to the stud shaft and operable by the foot treadles 3 and 4, pivoted on one of the legs $d$ of the apparatus. At its upper end the driving shaft 1 carries a gear 7 which may be controlled through the intermediary of clutch $m$ and lever 29, to rotate the bevel gear 25 whenever desired. It is by this means that the shaft $j$ for the arm of the welding apparatus which carries the work to be welded is driven. Because of the link connections between the clutch-member 2 and the foot-treadles 3 and 4, it is clear that if the foot-treadle 3 is pressed downwardly the clutch-member 2 will be thrown to the right (see Fig. 4) and the treadle 4 will be moved upwardly. This operation will cause the clutch-member 2 to engage with the clutch-member on the end of the shaft $b$, which, as before described, is connected to a suitable power device by a belt connection, or other means. It is obvious from Fig. 4 that the treadle 4 when pressed downwardly will disconnect the clutch-member 2 from shaft $b$.

The apparatus, as a whole, travels on the tracks $a$. The shaft $b$ is arranged with a clutch-member at each end thereof and the driving-pulley at the middle. By this arrangement two distinct apparatus may be mounted on tracks $a$ and each connected to shaft $b$ to receive power therefrom. The apparatus is wheeled up to the desired position and the wheels on the ends of the legs $d$ will come to a stop against the lugs $2'$ fastened to the tracks $a$. This will automatically square the apparatus up so that a proper connection may be made, by means of the clutch 2, to the driving-shaft $b$. As before stated, this connection is made by pressing the foot-treadle 3 downwardly and is disconnected by pressing the foot-treadle 4 downwardly. A bell-crank locking lever $29'$ (see Fig. 4) is pivoted to one of the legs $d$ and its inner end is connected to lever 3. When the latter is depressed, the outer end of lever $29'$ is hooked over the stop $2'$ to lock the apparatus in place. With the apparatus in place, the operation is as follows:

A cylindrical tank $A$, consisting of a shell previously rolled into cylindrical form from a rectangular blank is brought up over the supporting arms $r$ in the manner indicated in Fig. 2, and the two free edges of the tank to be joined are brought up over the concentric surface of the particular arm $h$ desired. The distancing-device $v$ is positioned on the feed-screw $j$ at a proper distance from the inner end of the tank and the edges of the latter are brought to abutting position in the horizontal slots 28 of the distancing-device (see Fig. 7). The outer edges of the tank are brought up over the concentric surface of the arm $h$ as far as possible and the devices $i$ are swung thereover and the bolts $t$ and $t'$ are operated to force the members $i$ to frictionally hold the margins of the tank $A$ in the manner indicated in Fig. 2. With the parts thus positioned, the gear 7 at the upper end of the driving-shaft 1 is brought into mesh with the gear 25 of the feed-screw corresponding to the arm on which the tank has been placed. This is done by swinging the arm $h$ around to the left-hand radial position seen in Fig. 4, and then by shifting the gear 7 upwardly by means of the hand-lever 29 and the collar attached to gear 7. This hand-lever 29 has a depending arm (shown dotted in Fig. 5) with two teeth on the end thereof with which a spring-pressed rod is adapted to coöperate. It will be seen from Fig. 5 that when the lever 29 is pressed downward, the gear 7 will be locked in the upper position and when the lever 29 is pulled upwardly the gear 7 will be locked in the lower position. A bracket 6 provides a bearing for the upper end of the driving-shaft 1. When this connection has been made with the feed-screw $j$, the distancing-device $v$ starts to travel outwardly on the feed-screw $j$, and as this distancing-device travels outwardly the torch supplying the welding flame is moved along behind the distancing-device either by hand or automatically by suitable mechanism. It will be seen that the device $v$ will positively hold the edges of the tank $A$ a given distance apart, and although this distance is relatively great, the edges of the tank, since they abut the converging slots 28, will converge toward the welding flame. The proper position of the distancing device in advance of the welding flame is such that the converging edges of the tank at the point of application of the welding flame are near enough for the welding to take place. The desired criterion is that the edges shall just meet as they expand under the heat of the flame so that a flat as against an overlapping seam is formed. The welding flame is so moved that it follows the distancing-device at approximately the same speed and the two thus move in constantly spaced relation. It should be noted that the tank when supported as described with the edges in converging relation is distorted from its normal cylindrical form into a strained frusto conical shape and that there is a continual tendency for the tank to assume its natural cylindrical form. The members $i$ frictionally hold the edges and in order for the latter to come together as the distancing device $v$ travels outwardly, the edges of the tank must move relatively to the members $i$. The natural tendency of the distorted tank to resume its normal shape may not be enough to overcome the grip of members $i$, but the latter cannot prevent the contraction of the shell as it cools after the welding operation. The contraction of the shell as the joined edges cool in back of the welding flame cause the tank to be drawn into true cylindrical form, and this contraction supplies the force necessary to draw the edges of the tank together as the distancing device recedes, so that, as the welding flame travels along, the edges of the tank just meet in under the flame and are welded in a flat butt seam.

The welding flame may be moved along by hand as described, but the apparatus may also be used with suitable automatic mechanism which will move the welding flame at the proper speed and in properly spaced relation with the distancing device $v$. An example of a suitable mechanism for accomplishing this function is disclosed in my copending application Serial No. 819,668, filed February 19, 1914, to which reference is made. By making these two operations automatic, the desired work will be done with the least amount of skill possible, for everything will be automatic in that case except installing and removing the tanks $A$ from the holding devices on the arms $h$.

When a seam has been formed, it is necessary to take the tank $A$ off from the arm $h$ in a radial direction, although the tank before it has been welded may be brought around the supporting arms $r$ from the side.

In order to remove the tank A, it is necessary to swing the members $i$ on their pivotal connections $t'$, and for this purpose the bolts $t$ and $t'$ are loosened and the bolts $t$ may swing outwardly through slots provided in the bosses in the end of the arm $h$, as before described. It will be understood that these devices $i$ will swing or spread apart from one another to an extent sufficient to clear the bolts $t$, so that the tank A may be removed from the apparatus radially without striking the latter.

It will be noticed from the general arrangement of this apparatus that a tank may be inserted on one of the arms $h$ and adjusted for proper operations while the welding operations are taking place on a tank held by one of the other arms $h$. After one tank has been finished the tank assembled on another arm $h$ may be swung into place so that the feed-screw of that arm $h$ will be driven by means of the gear 7 and the welding operations started with the least loss of time possible. Thus, by the use of the apparatus described, the welding operations are, in effect, continuous and the man handling the apparatus does his work with the least amount of delay and trouble. This combination enables a very large output, where under the present practice a great deal of time is wasted and the output is small and the quality of the work is not uniform, even with skilled labor.

While applicant has described the specific form of his apparatus which he prefers to use, it is to be understood that this preferred form has been shown and described specifically only for the purposes of illustration and it is not intended to limit the invention, broadly, to the preferred form shown, for it may be applied in many other specific forms.

What I claim is, —

1. A welding apparatus, comprising, in combination, a supporting member adapted to fit within and support a cylindrical shell to be welded, a distancing device arranged to travel in said member and at a predetermined distance in advance of the welding flame, and means frictionally holding each edge of the shell to said member with the seam to be welded therebetween, said device constructed to so hold the edges that they converge toward the point of application of the welding flame and so that the expanding edges just meet in under the flame as they are welded, whereby overlapping of the edges is prevented.

2. A welding apparatus, comprising, in combination, a supporting member adapted to receive a cylindrical shell to be welded, a wedge-shaped distancing device movable in said member and adapted to travel between and separate the edges of the shell to be welded, said device arranged to travel in advance of the welding flame, and means to frictionally hold the shell to said member, whereby the edges of the shell may be held in abutting relation with said device, so that they converge toward the welding flame, all constructed and arranged so that the edges in the vicinity of the flame are so separated that, as they expand under the heat of the flame, they come together in abutting relation and are welded in a flat seam without overlapping.

3. A welding apparatus of the class described, comprising in combination, a frame having thereon a plurality of holding means each constructed and arranged to frictionally hold the edges of a cylindrical shell in approximate position for welding, together with a device for each means arranged to occupy a position at a desired point between said edges and prevent the edges overlapping in the welding operation, and means for movably mounting each of said devices, all constructed and arranged so that the edges of the shell to be welded may be positively held apart in the immediate vicinity of the point where the weld-forming flame is applied to allow the expanding edges of the metal in the welding operation to come together in abutting relation to form a flat seam without overlapping and provide an apparatus in which shells to be welded may be assembled and held in position while other parts previously assembled are being welded.

4. A welding apparatus, comprising, in combination, a supporting member adapted to receive a cylindrical shell, the edges of which are to be welded, a wedge-shaped distancing device arranged to travel in said member and adapted to move a constant and predetermined distance in advance of the welding flame, said device arranged to move between said edges and hold the latter in converging relation toward the welding flame, and means to frictionally hold the shell to said member, all constructed and arranged so that the edges as they expand in under the flame will just meet and be welded in a flat seam.

5. A welding apparatus of the class described, comprising, in combination, a supporting stand, a plurality of work-supporting arms movably mounted on the stand, each arm having holding means constructed and arranged to frictionally hold the edges of parts in approximate position for welding, together with a device arranged to occupy a position between said edges and prevent them from overlapping in the welding operation, all for the purpose described.

6. A welding apparatus of the class described, comprising, in combination, a supporting stand, a plurality of radial work-supporting arms movably mounted on the stand, each arm having a part with two horizontal supporting upper surfaces approximately concentric with tanks to be welded and two horizontally movable members arranged to coöperate with said part and hold a tank to be welded with the edges distanced apart, a movable device arranged to travel between the edges of a tank supported on said arm and positively distance the edges of the tank for the welding operation, together with means for feeding said device along between the edges during the welding operations, all for the purpose described.

7. A welding apparatus, comprising, in combination, a supporting stand, a plurality of radial work-supporting arms movably mounted on the stand and extending outwardly therefrom, each arm formed with two spaced horizontal surfaces to support a cylindrical shell with the edges to be welded therebetween, two spaced members mounted on each arm movable away from said surfaces to permit a shell to be freely placed thereon and thereafter movable toward said surfaces to engage the shell, and means to force said members downwardly to frictionally hold the shell to said surfaces with the edges to be welded positioned between said members and surfaces and freely exposed for welding.

8. A welding apparatus, comprising, in combination, a supporting stand, a plurality of radial work-supporting arms movably mounted on the stand, each arm having a part with two horizontal surfaces to support cylindrical shells to be welded, two pivoted members arranged to be swung away from said surfaces to permit a shell to be placed thereon and thereafter to be swung toward the surfaces to overlie the shell thereon and means to force said members downwardly against the supporting surfaces to frictionally hold the edges of the tank thereto.

9. A welding apparatus, comprising, in combination, a central supporting stand, a head rotatable thereon, a plurality of radial work-supporting arms extending outwardly from said head, each arm having a part with two horizontal surfaces to support cylindrical shells to be welded, two members pivoted to each arm, means to bind said members to said surfaces with the edges of the tank to be welded frictionally held therebetween, said means arranged to permit said members to be swung away from said surfaces, whereby a shell may be conveniently placed on said surfaces, and a plurality of adjustable supporting members on either side of each arm arranged to engage the shell to be welded at a distance from said members.

10. A welding apparatus, comprising a central support, a head rotatable thereon, a plurality of radial work supporting arms extending outwardly from said head, each formed with two spaced horizontal supporting surfaces approximately concentric with the cylindrical shells to be welded, members also formed with surfaces approximately concentric with the tanks to be welded and arranged to overlie said first-named surfaces, means operative to force said members to the arm with the edges of the tank to be welded held frictionally therebetween in position for welding the longitudinal seam thereof, said means arranged to permit said members to be moved away from said arms, whereby the latter are freely exposed to permit a shell to be moved axially along the arms, a plurality of auxiliary supporting arms arranged on either side of each arm and adapted to engage the inner periphery of the shells to be welded at a distance from said members, and means operable to move said auxiliary arms simultaneously to permit adjustment of the latter for supporting shells of various diameters.

HENDERSON G. DAVIS.

Witnesses:
A. B. Frost,
F. G. Neal.